(12) United States Patent
Byrd et al.

(10) Patent No.: US 7,186,946 B2
(45) Date of Patent: Mar. 6, 2007

(54) LASER DRILLING

(75) Inventors: Pamela Jean Byrd, Coleford (GB); Helen Edwards, Bristol (GB)

(73) Assignee: Rolls-Royce plc, London (GB)

( * ) Notice: Subject to any disclaimer, the term of this patent is extended or adjusted under 35 U.S.C. 154(b) by 176 days.

(21) Appl. No.: 10/938,521

(22) Filed: Sep. 13, 2004

(65) Prior Publication Data
US 2005/0061787 A1   Mar. 24, 2005

(30) Foreign Application Priority Data
Sep. 20, 2003   (GB) .................................. 0322074.6

(51) Int. Cl.
*B23K 26/38* (2006.01)
*B23K 26/14* (2006.01)
(52) U.S. Cl. .............................. 219/121.71; 219/121.84
(58) Field of Classification Search ........... 219/121.84, 219/121.7, 121.71
See application file for complete search history.

(56) References Cited
U.S. PATENT DOCUMENTS
4,153,386 A * 5/1979 Leogrande et al. ......... 415/115
6,204,475 B1 * 3/2001 Nakata et al. ........... 219/121.84
2003/0066821 A1 * 4/2003 Wybrow et al. ........ 219/121.71

FOREIGN PATENT DOCUMENTS

| DE | 19848152 | | 4/2000 |
|----|----------|---|--------|
| GB | 2099349 A | | 12/1982 |
| JP | 11-151590 A | * | 6/1999 |
| JP | 11-320171 A | * | 11/1999 |
| JP | 2000-170475 A | * | 6/2000 |

* cited by examiner

*Primary Examiner*—Geoffrey S. Evans
(74) *Attorney, Agent, or Firm*—Oliff & Berridge, PLC

(57) ABSTRACT

A method of laser drilling a gas turbine engine nozzle guide vane segment made up of two or more adjacent aerofoil sections spaced apart so that between each pair of aerofoil sections there are entry, throat and exit sections. The laser beam is directed at the surface of the aerofoil section to be drilled through either an entry or an exit section and a jet of assist gas is directed at the point of incidence of the laser beam through the other of the entry or exit sections.

3 Claims, 3 Drawing Sheets

LASER DRILLING

This invention relates to laser drilling and in particular concerns drilling film cooling holes in gas turbine engine components such as nozzle guide vane aerofoil sections.

Lasers are used extensively in manufacturing processes for drilling holes in workpiece components. The focusing head of a typical laser drilling apparatus comprises one or more lenses and/or mirrors to concentrate the laser beam on the workpiece to be drilled. The beam exit section of the focusing head comprises a nozzle for generating a high pressure flow of assist gas at the nozzle exit coaxial with the laser beam exiting the focusing head of the laser. The assist gas acts on the workpiece to blow away molten material ejected from the hole being drilled and to maintain a protective flow of gas around the lens of the focusing head of the laser to protect the lens from weld debris, i.e. splatter. When assist gas comprises oxygen the gas reacts with the material being drilled and increases the rate at which material is removed by the laser. The assist gas also acts to cool the workpiece being drilled, minimising the heat affected zone in the material adjacent to the drilled hole.

The distance between the nozzle exit and the workpiece (known as the standoff distance) is critical because the pressure of the assist gas varies with this distance. The nozzle standoff distance is usually dictated by the accessibility of the laser head with respect to the site of the hole or holes to be drilled. Typical standoff distances are of the order of the nozzle diameter, for example about 3 mm. Smaller distances result in higher pressures but are more sensitive to slight variations in the standoff distance during the drilling process. The alignment of the focused laser beam with respect to the centre of the assist gas nozzle is extremely critical for uniform cutting in all directions. Known laser drilling systems all provide a means for finely adjusting the concentricity of the laser beam in the nozzle exit so that a coaxial flow of assist gas is maintained around the laser beam during drilling.

The film cooling holes found in the aerofoil wall sections of gas turbine engine nozzle guide vanes are usually drilled by laser. Accessibility can be a problem where the nozzle guide vanes are cast in pairs, that is to say with a pair of aerofoil sections in one cast component. Significant cost savings can be achieved where nozzle guide vanes are cast in pairs rather than singly. However, these cost saving can be negated by the added complexity of drilling film cooling holes where restricted access can prevent the holes being laser drilled. This problem is often encountered when drilling rows of film cooling holes through the pressure surface of cast nozzle guide vane pairs, particularly towards the leading edge of one of the aerofoil sections.

There is a requirement therefore for an improved method of laser drilling a workpiece where the accessibility of the combined laser and assist gas nozzle is restricted, for example when drilling rows of film cooling holes through the pressure surface wall of nozzle guide vane aerofoil sections when the vanes are cast in segments comprising at least two vanes.

According to an aspect of the invention there is provided a method of laser drilling a workpiece, the said method comprising:

directing a laser beam at the surface of a workpiece to be drilled by the laser beam;

directing a jet of assist gas towards the point of incidence of the laser beam on the workpiece;

characterised in that the said jet of assist gas is directed towards the workpiece at an angle with respect to the laser beam wherein the angle of the jet of gas with respect to the laser beam is in the range of 5 to 75 degrees.

The method of the present invention overcomes the technical problem of laser drilling holes in a workpiece where the access of the laser focusing head and assist gas nozzle to the workpiece is restricted to the extent that the standoff distance between the laser nozzle exit and the workpiece to be drilled is too great for satisfactory drilling performance. The method of the present invention overcomes this problem by separating the assist gas supply and the laser so that the assist gas is directed onto the workpiece at an angle with respect to the laser beam. In contrast to known methods, the assist gas of the present invention is delivered to the workpiece as a separate jet which is non-coaxial with the laser beam. The present inventors have shown that in the method of the present invention holes that are drilled by the laser are drilled in the direction of the laser beam and not the direction of the assist gas jet incident upon the workpiece being drilled.

In preferred embodiments, the angle of jet of assist gas with respect to the laser beam is in the range of 5–75 degrees. The angle of the assist gas jet may be selected in accordance with accessibility constraints and therefore holes may be drilled by the laser even where the assist gas is directed onto the workpiece at a significant angle to the laser beam.

The laser beam may be inclined at an angle with respect to the surface of the workpiece component being drilled. The method of the present invention is therefore particularly suitable for laser drilling film cooling holes in gas turbine engine components. In particular a gas turbine engine combustor or turbine component.

In preferred embodiments, the pressure of the assist gas is substantially in the range of 1–5 bar.

Preferably the assist gas comprises oxygen and the workpiece material is a metal or a metal alloy. Oxygen produces an exothermic reaction with the workpiece material and therefore increases the cutting speed of the laser.

In an embodiment of the present invention, the workpiece comprises a gas turbine engine nozzle guide vane segment having two or more aerofoil sections with a nozzle entry, throat and exit section between adjacent aerofoil sections. The laser beam is directed in a first direction through one of the nozzle entry or exit sections of an adjacent pair of aerofoils onto the surface of one of the aerofoil sections that is to be drilled by the laser. Simultaneously, the jet of assist gas is directed onto the point of incidence of the laser beam on the aerofoil surface in a second direction through the other of the nozzle entry or exit sections. In this way the assist gas is supplied at one end of the gas flow passage between the aerofoil sections while the laser beam enters the gas flow passage from the other end. Preferably, the jet of assist gas is delivered onto the surface of the aerofoil by an assist gas nozzle that passes through the other of the entry or exit sections. In preferred embodiments, the laser beam is directed through the nozzle exit section and the assist gas is directed through the nozzle entry section. This readily enables film cooling holes to be drilled in the pressure surface wall of an aerofoil on one side of a gas flow passage defined by two adjacent aerofoil sections. Separation of the laser drilling head and assist gas nozzle enables cooling holes to be drilled at positions and angles with respect to the aerofoil surface previously unobtainable with a combined laser head and coaxial assist gas nozzle.

By separating the laser head and the assist gas nozzle the method of the present invention readily enables holes to be drilled where a line of sight exists between the laser and the component since the assist gas nozzle does not restrict the positioning of the laser head as occurs with a combined laser head and coaxial assist gas nozzle.

The present invention also contemplates an article manufactured in accordance with the method of the present invention, and a nozzle guide vane for a gas turbine engine manufactured in accordance with the aforementioned method of the present invention. According to another aspect of the invention there is provided laser drilling apparatus comprising a laser for generating a laser beam for drilling and a gas assist nozzle arranged to supply assist gas at an angle with respect to the laser beam.

Preferably, the angle of the assist gas with respect to the nozzle is variable. This readily enables the apparatus of the present invention to be used for drilling holes where accessibility is more or less restricted.

Preferably, the distance between the exit section of the laser and the point of intersection of the laser with the jet of assist gas is variable. In this way it is possible to adjust the position of the nozzle exit with respect to the exit section of the laser so that the point of intersection of the assist gas with the laser beam can be adjusted in dependence on the size and shape of the workpiece to be drilled and the accessibility of the assist gas nozzle to the point of incidence of the laser on the workpiece.

In preferred embodiments, the gas assist nozzle is connected to the laser for movement with the laser between different drill sites on the surface of the workpiece. This readily enables rows and/or columns of holes to be drilled without having to realign the laser and assist gas nozzle for each hole in the row or column. For example, a row of film cooling holes may be drilled in the surface of an aerofoil section of a nozzle guide vane by moving the laser and assist gas nozzle together in one or more directions to drill each hole in the row or column.

In preferred embodiments, the exit section of the laser is provided with a means for supplying a pressurised gas in the region of the laser exit to shield the laser from molten material ejected from the hole being drilled by the laser.

An embodiment of the present invention will now be more particularly described, by way of example, with reference to the accompanying drawings, in which.

Figure 1:
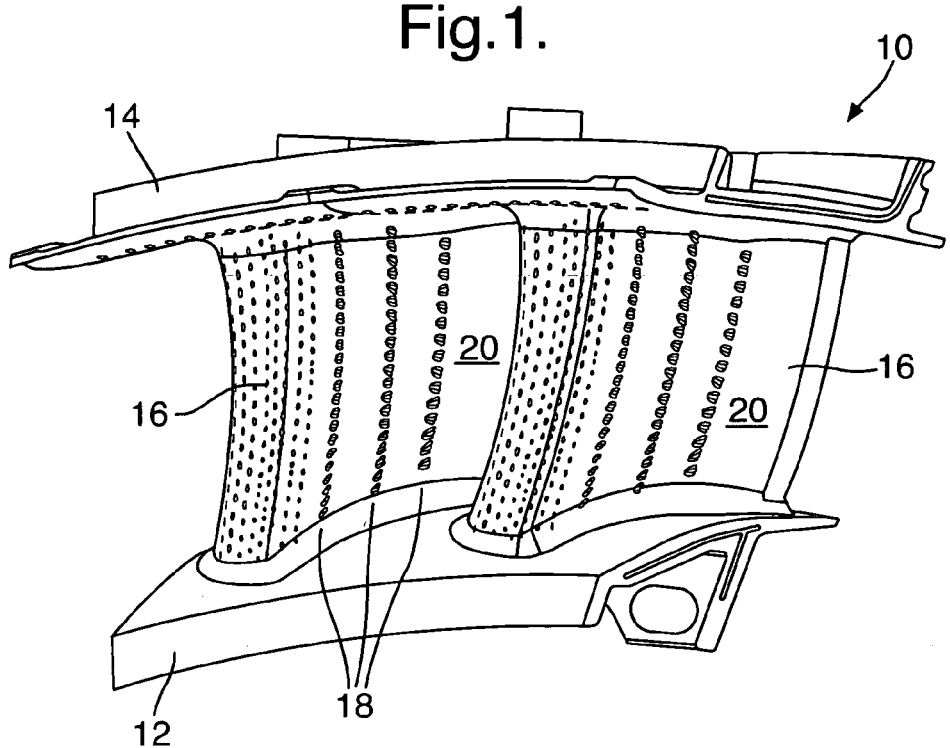
FIG. 1 shows a nozzle guide vane segment for a gas turbine engine in which the segment comprises a pair of aerofoil vane sections.

With reference to FIG. 1, a nozzle guide vane segment 10 for a gas turbine engine (not shown) comprises inner and outer arcuate platforms 12 and 14 with a pair of aerofoil section vanes 16 extending spanwise between the inner and outer platforms. The aerofoil sections 16 are provided with a plurality of rows of film cooling holes 18 over both the pressure and suction surfaces of the aerofoil section. In the drawing of FIG. 1 only the pressure surface 20 is shown. The suction surface on the other side of the aerofoil is hidden from view.

The film cooling holes 18 are drilled by a laser or by EDM (electro discharge machining) drilling apparatus and the holes are drilled at various angles of incidence to the surface of the aerofoil.

Nozzle guide vane segments such as the one shown in FIG. 1 may be either cast in pairs or singly and then braised together to form a pair.

Figure 2:
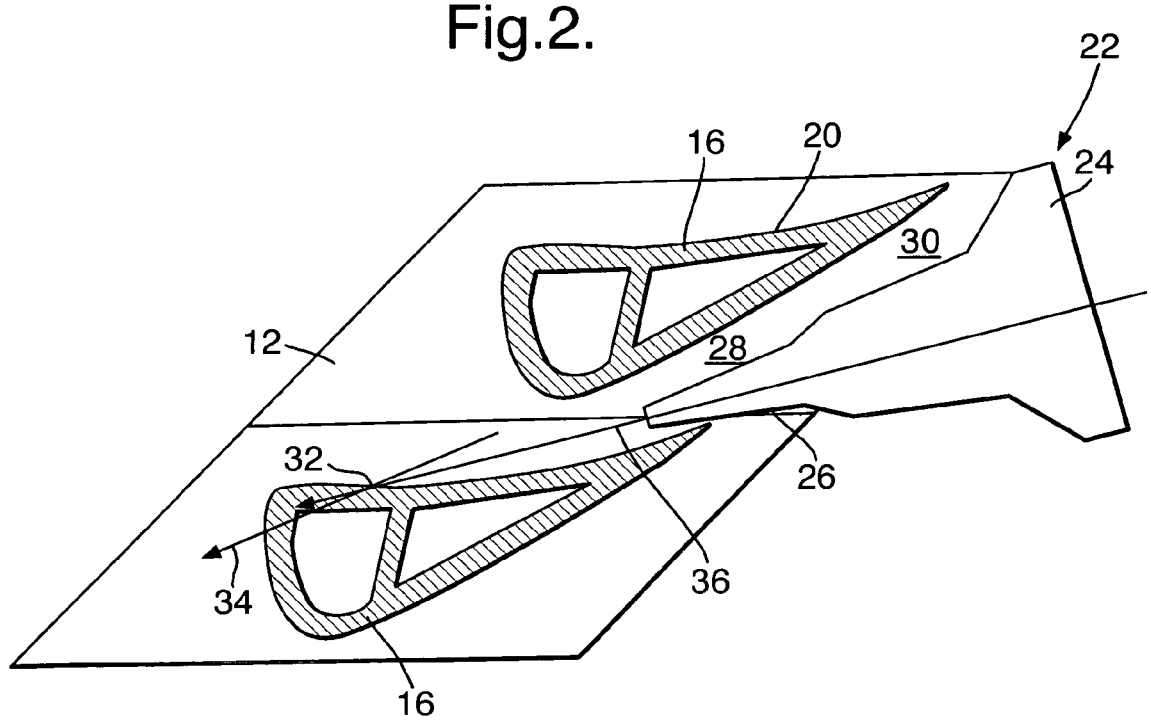
FIG. 2 is a cross-section schematic view of a nozzle guide vane segment of the type shown in FIG. 1, with a combined laser head and coaxial assist gas nozzle positioned between the vanes for laser drilling film cooling holes.

When cast singly the rows of film cooling holes can be readily drilled with known coaxial laser drilling apparatus in which the assist gas is discharged coaxially with the laser beam onto the surface of the vane where the hole is to be cut. However, depending on the shape, size, configuration and position of the film cooling holes, laser drilling with a coaxial gas assist is not always possible when the vanes are cast in pairs. As can be seen in FIG. 2, a known laser drilling apparatus 22 comprising a laser focusing head 24 and a gas assist nozzle 26 is positioned between the aerofoil sections 16 of a cast nozzle guide vane segment of the type shown in FIG. 1. The positioning of the coaxial laser drilling apparatus 22 is restricted in the region between the adjacent vanes due to the relative dimensions of the laser drilling head 22 and the nozzle gas flow passage 28 between the adjacent aerofoil sections 16. In the drawing of FIG. 2 the head of the laser drilling apparatus enters the gas flow passage 28 at the nozzle exit end 30 of the gas flow passage 28. The position of the laser head 22 in the drawing of FIG. 2 represents the maximum angle the laser head is capable of being positioned in the nozzle gas flow passage 28 for drilling a hole in the nozzle guide vane pressure surface forming the flow passage 28 at a point 32 on the aerofoil. The required angle of the cooling hole at the point 32 is indicated by the line 34. The relative dimensions of the laser head 22, the nozzle entry section 30 and gas flow passage 28 prevent the laser beam 36 being rotated further to a position where the line of the laser 36 is coincident with the required direction of the cooling hole, as indicated by line 34, at the point of incidence 32.

Figure 3:
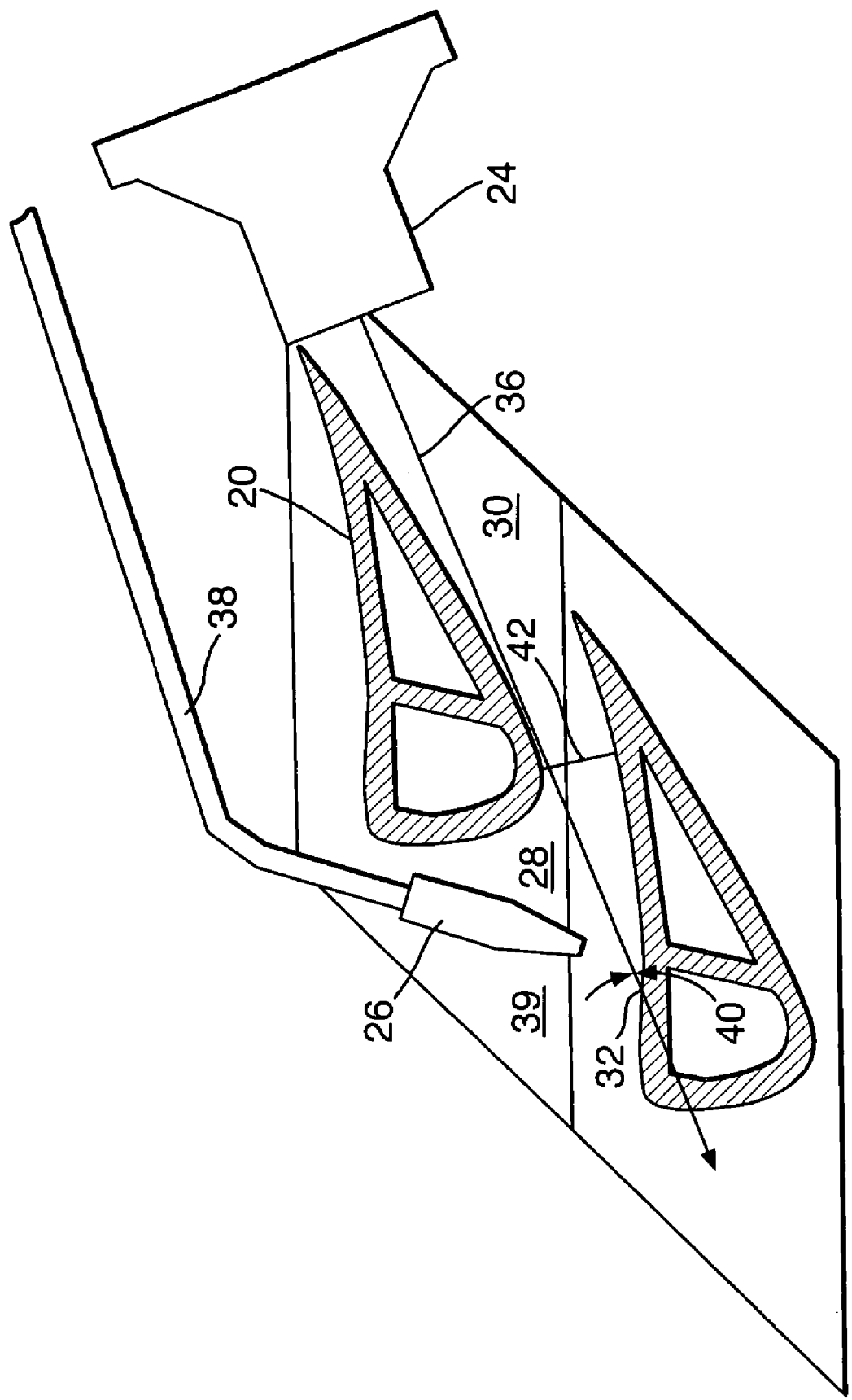
FIG. 3 is a cross-section view similar to that of FIG. 2 with a modified laser drilling apparatus for use in the method of the present invention; and, FIG. 4 shows a laser head and assist gas nozzle according to an embodiment of the present invention.

Referring now to FIG. 3, in the method of the present invention the laser drilling apparatus comprises a separate laser focusing head 24 and gas assist nozzle 26. By separating the gas assist nozzle from the laser focusing head 24, the focussing head 24 can be positioned such that the laser beam is incident on the surface of the aerofoil at the point of 32 at the required angle as indicated by line 34 in the drawing of a FIG. 2. The assist gas nozzle 26 is connected to a gas delivery tube 38 which is routed around the pressure surface 20 of the adjacent aerofoil of the cast pair and enters the gas flow path 28 between the aerofoil sections at the entry section 39 of the nozzle gas flow path. The assist gas nozzle 26 and its associated delivery tube 38 are positioned so that they do not restrict the maximum angle of the laser beam incident on the aerofoil surface, or interfere with the incident laser beam. The assist gas nozzle 26 is directed onto the surface of the aerofoil at the point 32 where the hole is to be drilled at an angle 40 with respect to the laser beam 36. The angle 40 may vary depending upon the angle of the cooling hole to be drilled with respect to the surface of the aerofoil section. For example, the angle 40 may vary between 5° and 75° depending on the geometry of the component being drilled. In the arrangement shown in FIG. 2 the laser beam enters the gas flow region between the vanes from the nozzle exit section 30 on one side of the nozzle throat 42 while the assist gas enters the gas flow passage through the nozzle entry section 39 on the other side of the nozzle throat 41. This prevents interference of the assist gas nozzle and delivery tube with the laser focussing head 24.

In the method of the present invention the laser beam 36 drills through the wall of the aerofoil section at the incident point 32 along the line of the incident laser beam.

Figure 4:
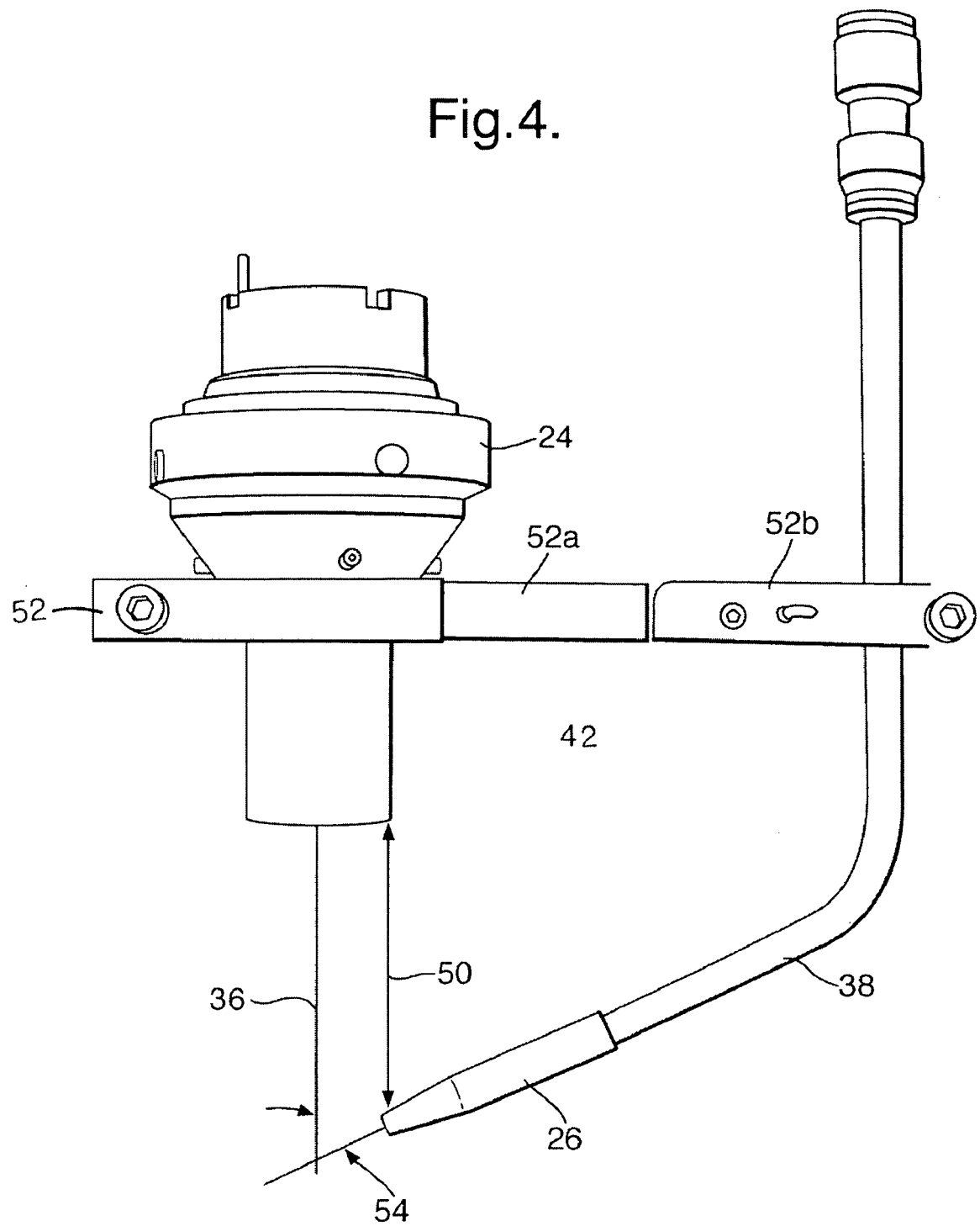

Referring now to FIG. 4 which shows a typical apparatus 42 suitable for use in the laser drilling method described with reference to FIG. 3. In the apparatus of FIG. 4 a gas delivery nozzle 26 is connected to a gas delivery pipe 38 for delivering high pressure gas to the nozzle 26 to generate a jet of assist gas. The nozzle 26 and delivery pipe 38 are secured to the end of the focussing head 24 of a laser which generates the beam 36 for laser drilling. The height dimension between the end of the laser and the nozzle exit, as indicated by dimension 50 in the drawing, is adjustable by means of the delivery pipe 38 being slidably mounted at one end of an adjustable fixing bracket 52 connecting the nozzle gas delivery pipe to the light emitting end of the laser. The bracket 52 comprises a first part 52*a* connected to the end of the laser optics and a second part 52*b* on which the delivery pipe 38 is slidably mounted. The two parts 52*a*, 52*b* are pivotally connected together so that the angle 54 between the laser beam generated by the laser and the assist jet can be adjusted over a range of angles from the position shown in the drawing where the nozzle exit is at about 70 degrees to the direction of the laser beam 3. The height dimension 50 may be adjusted by repositioning the tube with respect to the bracket part 52*b* so that the nozzle 26 can be used with different focal length lenses of the laser.

Although aspects of the invention have been described with reference to the embodiment shown in the accompanying drawings, it is to be understood that the invention is not limited to the precise embodiment shown and that various changes and modifications may be effected without further inventive skill and effort. For example, the method of the present invention contemplates embodiments where workpiece components other than gas turbine engine nozzle guide vanes are laser drilled. Indeed the method of the present invention is applicable to all laser drilling applications where holes have been previously drilled using a laser focussing head with a coaxial gas assist nozzle.

The invention claimed is:

1. A method of laser drilling a workpiece, the method comprising:
   directing a laser beam at the surface of a workpiece to be drilled by the laser beam;
   directing a jet of assist gas toward the point of incidence of the laser beam on the workpiece;
   wherein the jet of assist gas is directed toward the workpiece at an angle in the range of 5 to 75 degrees with respect to the laser beam;
   wherein the workpiece comprises a nozzle guide vane segment of a gas turbine engine having two or more aerofoil sections with a nozzle entry, throat and exit section between adjacent aerofoil sections; and
   wherein the laser beam is directed in a first direction through one of the nozzle entry or exit sections of an adjacent pair of aerofoils onto the surface of one of the aerofoil sections to be drilled by the laser, and the jet of assist gas is directed to the point of incidence of the laser beam on the aerofoil surface in a second direction through the other of the entry or exit sections.

2. The method as claimed in claim 1 wherein the jet of assist gas is delivered to the point of incidence by a nozzle passing through the other of the entry or exit sections.

3. The method as claimed in claim 1 wherein the laser beam is directed through the nozzle exit section and the assist gas is directed through the nozzle entry section.

* * * * *